INVENTOR.
Jack B. Reynolds

INVENTOR.
Jack B. Reynolds
BY James L. Marquardt
ATTORNEY

United States Patent Office 3,354,863
Patented Nov. 28, 1967

3,354,863
APPARATUS FOR COATING PARTICULATE MATERIALS
Jack B. Reynolds, Ludington, Mich., assignor to The Dow Chemical Company, Midland, Mich., a corporation of Delaware
Filed Oct. 28, 1963, Ser. No. 319,384
2 Claims. (Cl. 118—62)

This invention relates to a method and apparatus for coating materials, and more particularly relates to a method and apparatus for the coating of finely divided materials with a coating liquid and drying such coating.

It is an object of the present invention to provide a method and apparatus whereby a wide variety of particulate materials may be coated and dried in a uniform manner.

Figure 1:
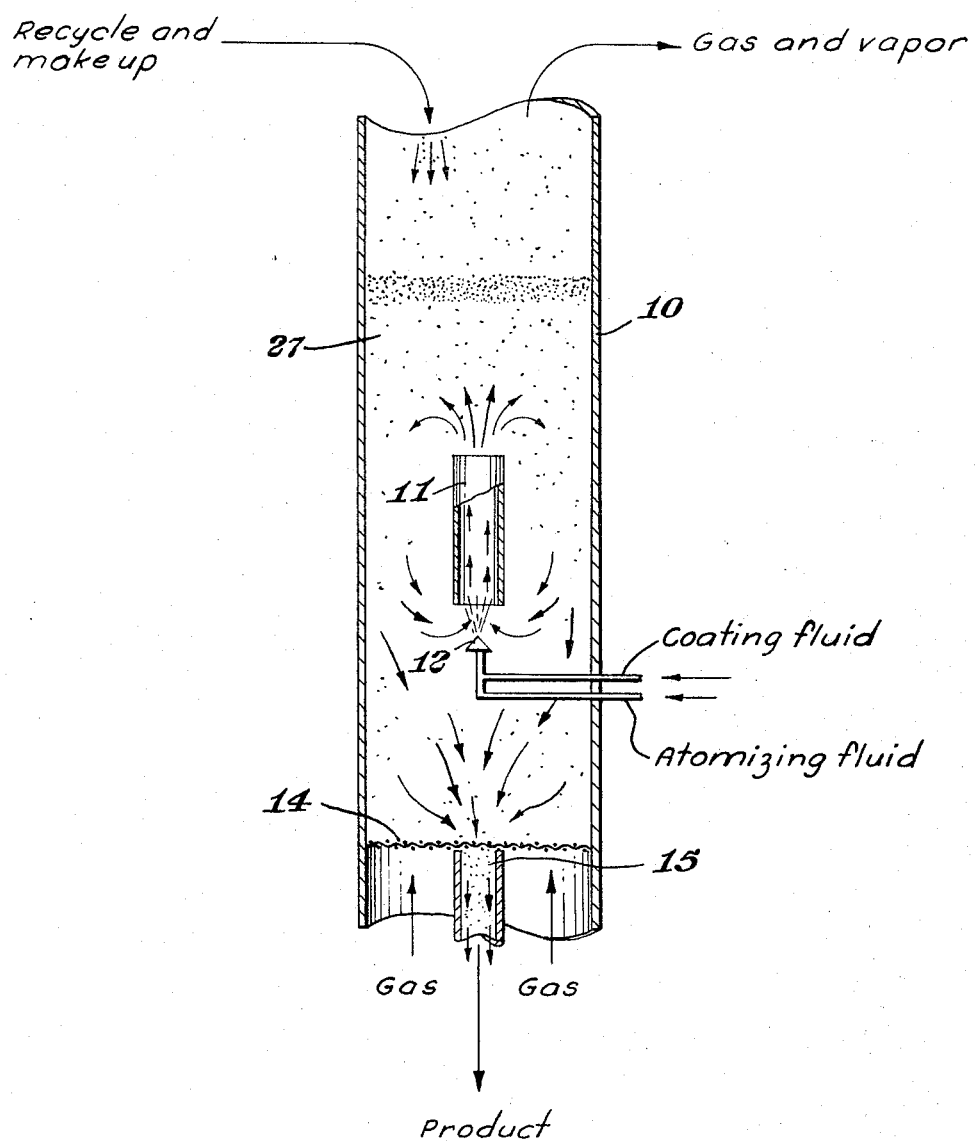
Figure 2:
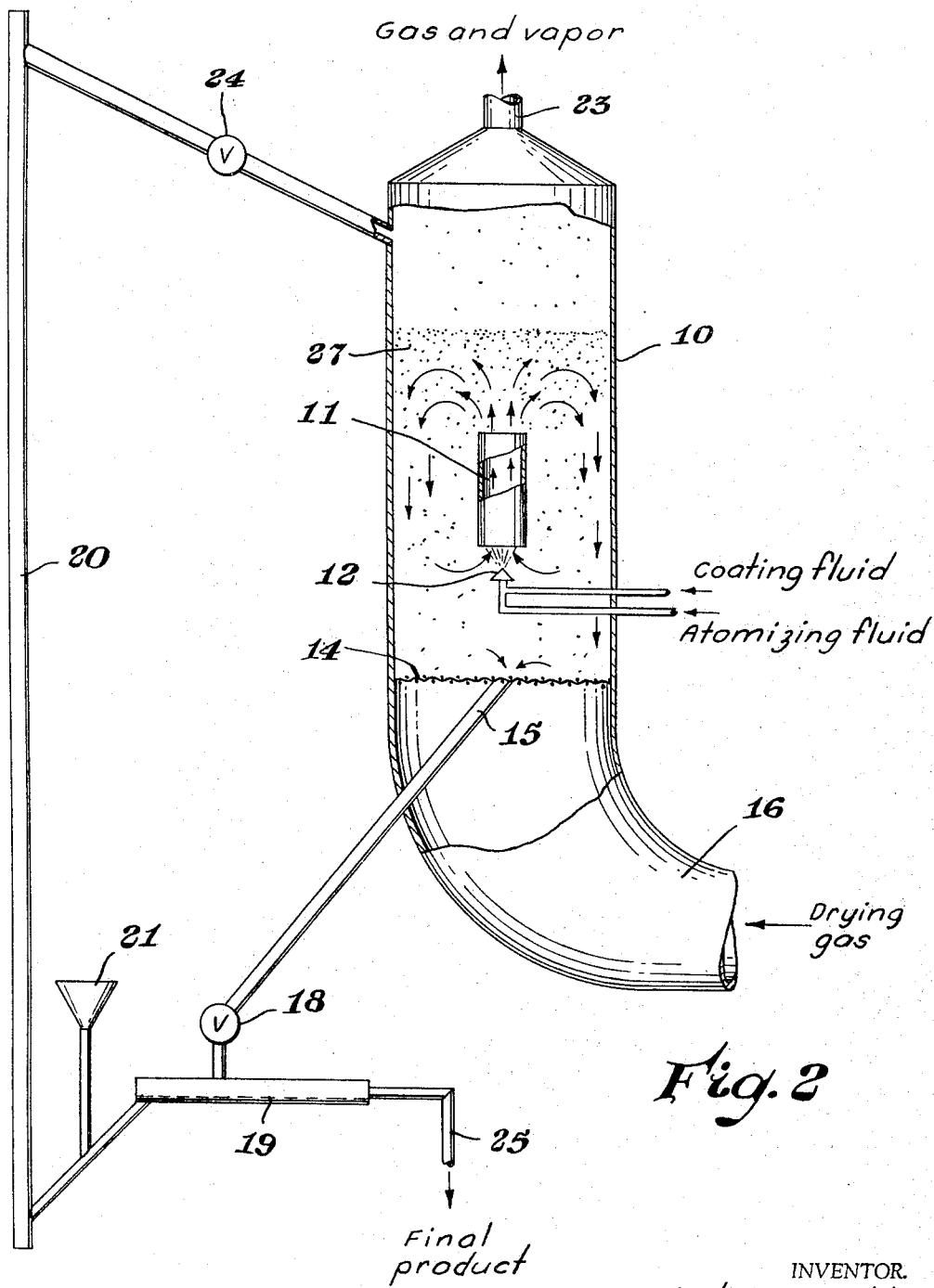

Other objects and advantages of the present method and apparatus will become apparent in the course of the following specification when considered with the accompanying drawings in which:

FIGURE 1 is a schematic drawing illustrating the relative positioning of essential elements of the present invention; and FIGURE 2 is a schematic drawing illustrating in more detail one embodiment of the present invention.

Turning to FIGURES 1 and 2; the apparatus consists generally of a vertically disposed column 10 having positioned substantially centrally therein a vertical draft tube 11. Positioned centrally to the draft tube 11 and in or slightly below the draft tube, is a bi-fluid nozzle 12. The bi-fluid nozzle 12 is oriented such that the flow of fluid therefrom is substantially upwardly through draft tube 11. Across the interior cross-sectional area of column 10 below nozzle 12 is positioned a grid 14. A product line 15 is positioned such that coated material may be removed from the portion of column 10 above grid 14 by gravitational means. An inlet gas duct 16 is positioned at the bottom of the column 10 and oriented such that drying gas may be passed vertically through column 10. Product recovery line 15 generally has attached thereto suitable valve means 18 and classification means 19. Elevator or lift means 20 are usually attached to the classification means 19 in order to raise particulate material to be introduced to the upper portion of the column 10. Means such as a hopper 21 are generally provided in order to start up or add make-up to the system. Exhaust duct means 23 is usually attached at or near the top of column 10. Valve means 24 may be connected to the elevator or lift means 20 to give further control of the rate at which particulate material is introduced to column 10. Product having the desired coating or size is generally recovered from a final product line 25 attached to classification means 19.

To start the process utilizing the apparatus schematically illustrated in FIGURES 1 and 2, material to be coated is loaded into hopper 21. Elevator means 20 is started, thereby forming, within column 10, a bed 27 of material to be coated, said bed being of a depth sufficient to cover the lower end of draft tube 11. Material from the bed 27 is withdrawn through product line 15 and elevated to the top of the bed 27 by elevator means 20. At about the same time, drying gas, which may be preheated, is introduced into column 10 by means of inlet gas duct 16 usually at a velocity such that the bed is below the minimum velocity required for total fluidization. By regulating the rate of the elevator or lift means 20, valves 18 and 24, and the gas flow rate through inlet duct 16 and grid 14, a reasonably steady state of bed height and density is achieved. Because of the continuous removal of material from the bottom of the bed and reintroduction to the top of the bed, the bed is in apparent constant downward motion. Flow of preheated gas through the bed during this start up procedure also raises the temperature of the bed material to the desired operating level. A bed of this nature (not-quite-fluidized) will be referred to hereinafter as "moving bed."

Once the desired operating bed temperature, level and density are attained, the bi-fluid nozzle 12 is started. The two fluids, fed through the nozzle, are generally the coating material and a suitable atomizing fluid. At the point of contact of the atomized coating material with the particles of the bed, dilute phase fluidization occurs which results in a thin, even layer of coating material being applied to the particles. The nozzle also aspirates some hot gas from the remainder of the bed, thereby partially drying the thin layer of coating material sufficiently to prevent agglomeration of the coated particles. Each of the coated particles is propelled by the stream from the bi-fluid nozzle upwardly through draft tube 11. Because of the upward motion imparted to the coated particles in the draft tube, the particles are propelled to the upper portion (above draft tube 11) of the column.

Upon reaching the upper portion of the column 10 and bed 27, the coated particles travel downwardly with the bed, countercurrent to the preheated gas and outside the draft tube 11, whereby the previously applied thin coating is finally dried. A given particle will preferably cycle at least once through draft tube 11 to receive a thin coating. Since a portion of the bed is being continuously withdrawn by means of product line 15, some particles may not receive a coating and some may receive more than one coating on a given downward pass through the column. Uncoated particles and particles not coated to the desired degree may be separated from the final desired product by classification means 19 and recycled by elevator means 20 to the upper part of column 10. As needed, make-up particles may be added to the recycle stream, as by hopper means 21. In this manner, by recycle and by circulation within the bed, each particle to be coated may receive a plurality of thin coatings until it reaches the ultimately desired coating thickness and overall size.

For larger diameter colums or deeper beds, it may be desirable to employ a plurality of draft tubes conveniently arranged within column 10. Each draft tube will have a suitable bi-fluid nozzle positioned as hereinbefore described.

Reference has been made herein to operating the bed 27 as a moving bed. The choice of operation is usually dependent on the material being coated or pelletized. In a moving bed as herein defined, an increasing temperature profile from the top to the bottom of the bed is usually obtained. Thus, the particles at the bottom of the bed are exposed to and generally raised to a higher temperature than the particles at the top of the bed. For non-temperature sensitive material, this is generally the preferred method of operation since the advantages of counter-current drying are best obtained in this manner. Temperature sensitive materials, however, may deteriorate, sublime, or be otherwise adversely affected by such a gradient. In this situation, a fluidized, or approximately fluidized, bed may be preferred, since fluidized beds generally have a uniform temperature throughout. By adjustment of the drying gas velocity and temperature, the bed temperature may then be controlled within the limits of the material being treated. Fluidization generally occurs in the final drying portion of the bed, i.e., below draft tube 11. Usually, sufficient drying gas wil be aspirated through draft tube 11 so as to prevent fluidization of the portion of the bed above the bottom end of tube 11.

From the above explanation, it also becomes apparent that the present apparatus and method are suitable as pelleting means. In pelleting, particles of a given material are coated with successive layers of the same material.

Dense, uniform pellets may be obtained. Thus, it is intended that pelleting be included within the scope of the present invention.

Suitable atomizing fluids are those liquids and gases which are substantially non-reactive either with the particulate material being coated or with the coating fluid. Coating fluids employed in accordance with the present invention are generally liquids which may be solutions or suspensions of the coating material or simply the coating material in liquid form.

Drying gases suitable for use in the present method and apparatus are those which are substantially non-reactive with either the particulate material being coated or with the coating fluid. Typical examples of suitable drying gases are: air, nitrogen, argon, helium, neon, and the like.

Employing the method and apparatus of the present invention metals, such as aluminum, may be coated with various oxiding materials, such as ammonium nitrate, thereby to produce explosive or fuel mixtures in convenient, easy to handle form. Pharmaceutical tablets may be coated with various materials in order to give them a more pleasing taste, or to inhibit their dissolution or to accomplish other desirable medicinal purposes. Particles of lime may be coated by the present method and apparatus with ammonium nitrate to give a useful fertilizer with sustained release characteristics.

Similarly, sodium chloride, sodium bromide, potassium chloride, potassium bromide, magnesium chloride, sodium pentachlorophenate, 2,4-dichlorophenoxyacetic acid, and magnesium sulfate may be pelleted in accordance with the present invention.

Coatings formed in accordance with the present invention are of uniform, easily controlled thickness and are free of undesirable pin holes and the like. When the method and apparatus of the present invention are employed as pelleting means, pellets of uniform size and density may be obtained having a free-flowing, substantially spherical shape. Good size control of product pellets is readily attained.

Using the apparatus substantially as described herein particles may be coated or pellets formed on a batch basis. When the batch process is employed, the column is simply loaded to the desired depth with particulate material and the drying air started. After the bed is at the desired operating temperature, the bi-fluid nozzle is started, thereby accomplishing a desired degree of coating over the required time. After the desired amount af coating has been accomplished the apparatus is shut off and the product removed from the column.

A better understanding of the present invention may be obtained in light of the following Examples which are set forth to illustrate, and are not to be construed to limit, the present invention.

Example 1

The apparatus was a vertically disposed cylindrical stainless steel column about 20 inches in diameter and about 29 feet in length. The upper end of the column was closed and had an air exhaust line attached thereto. An inlet port for starting and recycle material was also located at the upper end of the column. Positioned near the bottom and within the column was a grid consisting of a horizontally disposed plate having $3/16$ inch holes on $3/4$ inch centers. A 3 inch diameter product recoverey tube extended downwardly through the center of the grid. The upper end of the recovery tube was flush with the upper surface of the grid. Below the grid the bottom end of the column formed a plenum for the passage of drying air. The plenum had an elbow such that the plenum became horizontal slightly below the grid portion of the column. At about 10 inches above the grid and disposed centrally within the column was positioned a bi-fluid nozzle. A cylindrical draft tube of 4 inch diameter pipe, 21 inches in length was centrally disposed in a vertical position within the column with the bottom end of said draft tube about 4 inches above the tip of the bi-fluid nozzle. The product recovery tube was connected to a rotary airlock valve and thence to a screen for recovering and classifying the product obtained. Elevator means were provided to recycle fine material to the top of the column.

The unit was preheated so that the air within the unit, the walls and other surfaces inside the unit were at a temperature of about 320° C. After preheating, calcium chloride particles of approximately 4 to 20 mesh size were loaded into the column to rest on the grid and form a bed about 32 inches in depth. Air was introduced to the bottom of the column through the plenum at a rate sufficient to give a superficial inlet velocity to the column of from about 4 to about 6 feet per second. The air was at a temperature of about 320° C. After about one-half hour the particles in the column had attained a temperature of approximately 320° C.

The rotary airlock valve and recycle elevator means were then started. Thus, a continuously downwardly moving bed about 32 inches in height was attained. The bi-fluid nozzle was then heated by passing steam therethrough for a period of about 5 minutes. The steam was introduced at a pressure of from about 70 to about 100 pounds per square inch gauge and at a temperature of about 220–250 degrees Centigrade. After preheating the nozzle with steam, an aqueous calcium chloride liquor containing from about 68 to about 70 percent calcium chloride and at a temperature of from about 158 to about 162 degrees Centigrade was introduced to the column through the bi-fluid nozzle at a rate of about 200 to 250 pounds per hour of calcium chloride while steam was also introduced through the bi-fluid nozzle as before.

Within the draft tube, particles were coated with aqueous calcium chloride liquor and moved upwardly through the draft tube. Upon reaching the top of the draft tube, the upwardly propelled, coated and partially dried particles were distributed over and within the upper portion of the moving bed. As the particles moved downwardly in the moving bed, upwardly moving hot air from the plenum substantially completed drying the particles. Upon reaching the bottom end of the draft tube adjacent the bi-fluid nozzle some of the particles re-entered the draft tube, received a further coating of aqueous calcium chloride liquor, and repeated the cycle of rising in the tube and descending with the bed. Some of the calcium chloride pellets in the bed continued to move downwardly to enter the outlet tube in the grid at the bottom of the column. Particles leaving the column through the product tube were classified and the undesirably small particles (fines) were recycled and reintroduced to the top of the column. In this manner, particles having substantially uniform size were obtained.

Spherical particles having a size of up to plus 8 mesh size were obtained with good product size uniformity depending on the screen size employed in the classifying product. Pellets produced by this method had a size distribution of about 37 weight percent plus 4 mesh size and about 62 weight percent plus 8 mesh size, the balance being fine pellets, all having good uniformity in spherical shape and dimension. Examination of the product obtained indicated that the particles were solid and free of undesirably large void spaces, pin holes, and the like.

Example 2

Employing the apparatus of Example 1, and operating in substantially the same manner, aqueous sodium metasilicate was dehydrated and sodium metasilicate pellets formed.

Fine particles of sodium metasilicate were loaded into the column to form a bed depth of from about 18½ to about 24¼ inches. Drying air was introduced at a superficial velocity of about 5½ feet per second at the drying air inlet temperature of 328 degrees Centigrade. Atomizing air was forced through the bi-fluid nozzle at a pressure of from about 67 to about 69 pounds per square inch gauge and a temperature of from about 120 to about 127 degrees Centigrade. Aqueous sodium metasilicate (Na₂SiO₃) at a temperature of about 112 degrees Centigrade was forced from the nozzle at a pressure of from about 1¼ to 1¾ pounds per square inch gauge. The feed rate of sodium metasilicate (solids) was about 26.7 pounds per hour. The concentration of sodium metasilicate in the aqueous liquor was from about 45 to about 46 percent.

The product obtained was a uniform dense pellet of a mesh size from about 20 mesh. Larger pellets may be obtained by recycling substantially larger proportions of the product obtained from the bottom of the column.

It was further observed that very little make-up of finely divided sodium metasilicate was necessary. A possible explanation for this phenomenon is that the hot liquor being atomized to coat the existing particles is at least partially flashed so as to form dust-like particles instead of being entirely used in coating of the existing particles. This dust (or fines) becomes recycled and later coated so as to give a continuous operation with little necessary make-up.

*Example 3*

The apparatus was a vertically disposed cylindrical column having an inner diameter of 4 inches and an overall height of about 43 inches. A grid plate having about seventy-two 0.063 inch diameter holes therein was positioned horizontally in the column near the bottom of the column. A bi-fluid nozzle was mounted flush with the center of the upper surface of the grid plate and directed substantially upwardly. About 2½ inches above the bi-fluid nozzle was vertically positioned a 1½ inch diameter by 11 inch long cylindrical draft tube.

Flakes of solid NaOH which had been ground through a 12 mesh sieve were loaded into the portion of the column above the grid to form a bed having a depth of from about seven to eight inches.

Drying air was introduced to the bottom of the column at a temperature of about 230 degrees Centigrade and at a rate of about 1000 cubic feet per hour measured at that temperature. Atomizing air was introduced to the column through the bi-fluid nozzle at a temperature of about 90 degrees Centigrade and a pressure of about 27 pounds per square inch gauge. Aqueous liquor containing about 50 percent by weight NaOH was also introduced through the bi-fluid nozzle at room temperature and at a rate of about 350 cubic centimeters per hour.

Operation of the column was substantially the same as in Examples 1 and 2, except that no external recycle was employed. The particles circulated in the column, being coated and elevated in the draft tube and descending with the bed outside the draft tube, for a period of about four hours.

Examination of the product after the four hour run revealed that dense, solid NaOH pellets of uniform, substantially spherical shape had been formed. About 27 percent of the pellets were greater than 8 mesh size and about 33 percent of the pellets were less than 8 mesh but greater than 12 mesh size.

*Example 4*

Employing the apparatus of Example 3, granules of aspirin were coated with a 50—50 mixture of ethyl cellulose and methyl cellulose.

The column was loaded with aspirin granules of predominantly +50 mesh size with about 15 percent of the granules being of +30 mesh size. A bed having a depth of 7–8 inches was thus formed. Drying air at room temperature was introduced to the bottom of the column at an average rate of about 475 cubic feet per hour, and room temperature atomizing air was introduced to the bi-fluid nozzle under an average pressure of about 15 pounds per square inch gauge.

Coating liquor containing about 3 percent by weight ethyl cellulose, about 3 percent by weight methyl cellulose, about 59 percent by weight methylene chloride, about 35 weight percent ethyl alcohol, and minor amounts of a red dye was introduced to the column via the bi-fluid nozzle.

Using the dye as an indication of the degree of coating, the operation was carried on for about one hour. After one hour had elapsed, the particles had a uniform reddish-pink color indicating a uniform coating and the operation was stopped. Examination of the aspirin granules revealed that each granule had received a uniform, substantially pin hole free coating of a 50—50 mixture of ethyl cellulose and methyl cellulose.

Various modifications may be made in the present invention without departing from the spirit of scope thereof, and it is to be understood that I limit myself only as defined in the appended claims.

I claim:

1. An apparatus for coating particulate material comprising; a vertically disposed column having a vertical draft tube positioned therein, a bi-fluid nozzle positioned within said column and below said draft tube, said nozzle directed substantially upwardly, thereby to propel atomizing and coating fluid through said draft tube, a grid across the interior of the column below the bi-fluid nozzle, a source of drying gas connected to the lower portion of the column below the grid, exhaust duct means communicating with the upper portion of the column, and a product recovery line communicating with the interior of the column above the grid.

2. An apparatus for coating particulate material comprising; a vertically disposed column having at least one vertical draft tube positioned therein, a bi-fluid nozzle positioned within said column and below each said draft tube, said nozzle directed substantially upwardly, thereby to propel atomizing and coating fluid through said draft tube, a grid across the interior of the column below the bi-fluid nozzle, a source of drying gas connected to the lower portion of the column below the grid, elevator means communicating between the lower and the upper portions of the columns, exhaust duct means communicating with the upper portion of the column, and a product recovery line communicating with the interior of the column above the grid.

References Cited

UNITED STATES PATENTS

| | | | |
|---|---|---|---|
| 2,340,567 | 2/1944 | Sargent | 117—100 |
| 2,986,475 | 5/1961 | Mesnard et al. | 117—100 |
| 3,036,338 | 5/1962 | Nack | 117—100 |
| 3,112,220 | 11/1963 | Heiser et al. | 117—100 |
| 3,117,027 | 1/1964 | Lindlof et al. | 117—100 |
| 3,152,005 | 10/1964 | Tuttle | 117—100 |
| 3,196,827 | 7/1965 | Wurster et al. | 117—100 |
| 3,253,944 | 5/1966 | Wurster | 117—100 |
| 3,255,036 | 6/1966 | Kramer et al. | 117—100 |
| 3,110,626 | 11/1963 | Larson et al. | 118—303 |

FOREIGN PATENTS 1,005,413   3/1957   Germany.

WILLIAM D. MARTIN, *Primary Examiner.*

E. J. CABIC, *Assistant Examiner.*